(12) United States Patent
Kusters et al.

(10) Patent No.: US 7,013,704 B2
(45) Date of Patent: Mar. 21, 2006

(54) SYSTEM FOR PERFORMING TESTS ON INTELLIGENT ROAD VEHICLES

(75) Inventors: Leonardus Johannes J. Kusters, Amstelhoek (NL); Ralph Jacques A. Kleuskens, The Hague (NL); Dirk Jan Verburg, Delft (NL); Albertus Clemens M. van der Knaap, Krimpen aan den Ijssel (NL)

(73) Assignee: Nederlandse Organisatie Voor Toegepast—Natuurwetenschappelijk Onderzoek Tno, Delft (NL)

( * ) Notice: Subject to any disclaimer, the term of this patent is extended or adjusted under 35 U.S.C. 154(b) by 44 days.

(21) Appl. No.: 10/311,965

(22) PCT Filed: Jun. 22, 2001

(86) PCT No.: PCT/NL01/00468

§ 371 (c)(1),
(2), (4) Date: Mar. 21, 2003

(87) PCT Pub. No.: WO02/01177

PCT Pub. Date: Jan. 3, 2002

(65) Prior Publication Data

US 2003/0183023 A1   Oct. 2, 2003

(30) Foreign Application Priority Data

Jun. 23, 2000   (NL) .................................. 1015517

(51) Int. Cl.
*G01M 17/007* (2006.01)
*G01M 19/00* (2006.01)
*G01S 7/40* (2006.01)
*G01S 7/497* (2006.01)

(52) U.S. Cl. ........................ 73/1.79; 702/104; 702/116

(58) Field of Classification Search ................. 702/97, 702/104, 116; 701/116, 96; 73/117–117.3, 73/1.79, 118.1, 122–128, 865.9
See application file for complete search history.

(56) References Cited

U.S. PATENT DOCUMENTS

| 4,843,895 A | | 7/1989 | Harper ...................... 73/805.9 |
| 4,980,869 A | | 12/1990 | Forster .................... 73/1.79 X |
| 5,392,631 A | * | 2/1995 | Elwell ......................... 73/1.79 |
| 5,675,518 A | * | 10/1997 | Kuroda et al. ................ 702/97 |
| 5,781,286 A | * | 7/1998 | Knestel ................. 356/139.09 |
| 5,964,822 A | * | 10/1999 | Alland et al. ............. 701/96 X |
| 6,257,054 B1 | * | 7/2001 | Rostkowski et al. .......... 73/117 |
| 6,301,532 B1 | * | 10/2001 | Kull et al. .............. 702/104 X |
| 6,684,149 B1 | * | 1/2004 | Nakamura et al. ............ 701/96 |

FOREIGN PATENT DOCUMENTS

| DE | 39 42 850 | 6/1991 |
| EP | 0 602 920 | 6/1994 |
| EP | 0 747 688 | 12/1996 |
| WO | 99 39173 | 8/1999 |
| WO | WO 2004/003586 A1 * | 1/2004 |

* cited by examiner

*Primary Examiner*—Thomas P. Noland
(74) *Attorney, Agent, or Firm*—Young & Thompson

(57) ABSTRACT

A system for carrying out research on a drivable vehicle or a component thereof, includes: a test stand on which the vehicle or the component can be positioned, which vehicle or which component is provided with at least one sensor for receiving signals from the environment of the vehicle or of the component, at least one object which is situated in the vicinity of the test stand, elements for generating a relative movement between the test stand and the at least one object, and a control computer for coordinating the relative movement between the test stand and the object.

29 Claims, 5 Drawing Sheets

SYSTEM FOR PERFORMING TESTS ON INTELLIGENT ROAD VEHICLES

BACKGROUND OF THE INVENTION

The invention relates to carrying out research on a road vehicle in relation to its environment. A road vehicle, such as a passenger car or a lorry, is almost always in an environment in which there are also other road vehicles. Consideration may be given, for example, to driving in queues or the like. As is known, in that context there are increasing problems relating to the ever growing demand for mobility, the increasing number of vehicles and the comparative lack of road capacity. The resulting delays in the transportation of people and goods cause considerable economic losses and lead to many other undesirable effects, such as road rage, late attendance at appointments and the like.

On the other hand, local infrastructure and environmental requirements restrict the growth of the road network. For these reasons, there is a need to search for more efficient and more intensive utilization of the existing road network. In this context, consideration is given to increasing the capacity of this network by enabling the vehicles to flow more uniformly and at shorter distances from one another, for example in columns or convoys ("platooning").

Improved flow of this nature can only safely be achieved if the vehicles and the road network are linked by means of intelligent systems. Such systems may comprise computers on board the vehicles, actuators for regulating speed and direction, sensors and possibly communications systems.

Examples of such systems which may be mentioned include "active cruise control", that is to say a system in which not only a specific, preset vehicle speed, but also a specific distance to a vehicle in front can be maintained. With a system of this type, it is possible to use a radar to measure the distance at which a vehicle is following a vehicle ahead, and this distance can be used to take over responsibility for the driver's function by means of automatic intervention in the actuation of brake and accelerator.

When developing intelligent systems for road vehicles, an important role is ascribed to simulation techniques. Such systems and vehicles, however, need to be extensively tested and analysed before safe and reliable implementation can be achieved in practice.

There have to date been various approaches in this respect. Firstly, it can be attempted to use computer simulation to carry out an analysis on the basis of a reality model. A simulation of this nature is inexpensive, but the reliability of the results is highly dependent on the model used. Moreover, significance can only be attached to such a model after extensive validation. However, great care is required when developing new systems, since unknown phenomena (such as non-linearities, insufficient degrees of freedom) can have a serious effect on the reliability of the model.

A second possibility for testing intelligent systems relates to the use of complete prototypes. The advantage of this is that all the components to be researched and also all physical effects are present. However, the high costs and complexity represent drawbacks. The reproducibility of such tests with complete prototypes also presents a problem. The tests are often disrupted by uncontrollable boundary conditions, such as wind, rain, state of the road surface and the like. Inadequacies in the prototype itself may also lead to problems. Furthermore, the risks associated with such tests are relatively great. For example, in tests which relate to short distances between the vehicles, collisions may occur, which cause danger to the test personnel and may lead to damage to the expensive prototypes.

According to a third possibility, tests on components or subsystems may be carried out on a test stand. However, a problem with stationary systems of this type is that it is not possible to adequately simulate the operation of sensors. After all, the correct operation of sensors and the associated control operations can only be investigated if relative movements are carried out. The latter is impossible with a stationary system of this type.

SUMMARY OF THE INVENTION

Therefore, the object of the invention is to make it possible to carry out realistic research on a mobile road vehicle without, however, entailing very high risks and costs. This object is achieved by means of a system for carrying out research on a mobile vehicle or a component thereof, comprising:

a test stand on which the vehicle or the component can be positioned, which vehicle or which component is provided with at least one sensor for receiving signals from the environment of the said vehicle or of the said component, at least one object which is situated in the vicinity of the test stand, means for generating a relative movement between the test stand and the at least one object, and a control computer for coordinating the relative movement between the test stand and the object.

In the system according to the invention, it is possible, depending on the type of research, to use a complete vehicle or a component thereof. The advantage of this is that it is possible to take account of all phenomena which arise during use of a vehicle of this type in practice. On the other hand, the vehicle is arranged in a (quasi-) stationary position on the test stand, so that it is possible to avoid risks caused by high speeds and the like. Alternatively, however, the object could also be stationary.

The intelligent system of the vehicle can be tested reliably and realistically since the environment with associated objects can now execute a movement generated by the control computer with respect to the vehicle on the test stand. In other words, the absolute speeds of vehicle and object(s) are drastically reduced. For the vehicle, it is even possible to reduce the most important, forwards speed to zero. The associated kinetic energy and the space taken up can therefore be limited to a minimum. Only different movements and different speeds are realized. Therefore, the system can be positioned in a covered area without any problems, with the result that the environmental conditions such as temperature, wind, moisture and the like can be controlled and the reproducibility of the test can be ensured.

Despite the fact that the vehicle cannot execute a forwards or reverse movement on the test stand, it is possible for other movements to be carried out. Examples mentioned are lateral or transverse movements, yaw rotations, pitch rotations and roll rotations (that is to say rotations about the vertical axis, the transverse axis and the longitudinal axis of the vehicle). Furthermore, all other phenomena associated with the longitudinal movement can be simulated if the vehicle is accommodated on a rolling test stand or a test stand with endless belts which interact with at least the driven wheels of the vehicle. In that case, the influence of the vehicle mass, the rolling resistance, side wind and the like can be simulated.

The test stand and the vehicle situated thereon can be controlled in the desired way by means of a central control computer. The control computer may hold a program which simulates at least part of the real state of the vehicle or of the component which is missing in the state in which the vehicle or the object is situated on the test stand. In this way, it is possible to study the performance of the vehicle; for example, it is possible to investigate the effects of interference, for example of a newspaper blowing up onto the proximity sensor, or an electromagnetic radiation source.

One advantage of the system according to the invention is that vehicles or components can be tested to different degrees of completeness. An example which may be mentioned is the testing of a complete vehicle, in a virtually real state, lacking only the longitudinal movement since the vehicle is fixed to the test stand. This missing degree of freedom can be simulated by the control computer, for example by driving the engine and the rolling test stand on which the wheels are situated in a suitable way.

A further example is formed by the testing of only a single sensor, for example the proximity sensor for active cruise control. In this case, the entire vehicle is simulated in the control computer. It is then possible, on the basis of this simulation, and the resultant movements of the test stand and the object, to investigate whether the sensor is satisfactory in terms of reaction speed and the like.

The object which is arranged movably may be designed in various ways. By way of example, it is possible to use a sensor which is connected to the infrastructure, as is used for the guidance of intelligent vehicles. In the system according to the invention, a sensor of this type may be arranged on a revolving endless belt, in order to simulate at least the forwards speed of the vehicle.

According to a variant of this design, it is possible for a belt of this type to bear measurement points, for example arranged in a grid pattern, in which case the sensor is situated in the vicinity of a surface of the belt and may be displaceable in the transverse direction along the said surface. In this case, the sensor may comprise, for example, an antenna which is attached, at a distance from a part of the belt, to a linear guide extending transversely over the belt.

It is also possible for the object itself to be designed as a mobile undercarriage which executes movements with respect to the vehicle on the test stand on the basis of instructions given by the control computer. With an arrangement of this type, it is possible to simulate the movements of vehicles which are overtaking one another.

To achieve a realistic simulation of the effects which the vehicle undergoes as a result of movements in the transverse direction, it is possible for the vehicle to be displaceable transversely with respect to the longitudinal direction of the vehicle. In this case, the test stand may be displaceable on a linear guide which extends transversely with respect to the vehicle longitudinal direction. To maintain undisturbed movements of the undercarriage, the test stand is adjoined by a driving surface over which the object can move.

There is also a fixed driving surface situated at the front and rear sides of the test stand; on either side of the test stand there is a driving surface which can be displaced in the same way as the test stand.

Naturally, it is possible to provide a plurality of undercarriages which each execute their own movement. By means of such a combination of a vehicle on the test stand and a plurality of mobile undercarriages, it is possible to obtain a reliable simulation of driving in queues and overtaking manoeuvres. A complete vehicle model may be mounted on the undercarriages, in order, for example, to be able to test the sensors as realistically as possible.

BRIEF DESCRIPTION OF THE DRAWINGS

The invention will now be explained in more detail with reference to a number of exemplary embodiments illustrated in the figures, in which.

DESCRIPTION OF THE PREFERRED EMBODIMENTS

The embodiment of the system according to the invention which is illustrated in FIG. 1–4 comprises a test stand, which is denoted overall by 1, and a mobile undercarriage 2. Only the wheels 3 of the vehicle situated on the test stand 1 are shown. The vehicle 4 is illustrated in its entirety in FIGS. 2 and 3.

Figure 1:
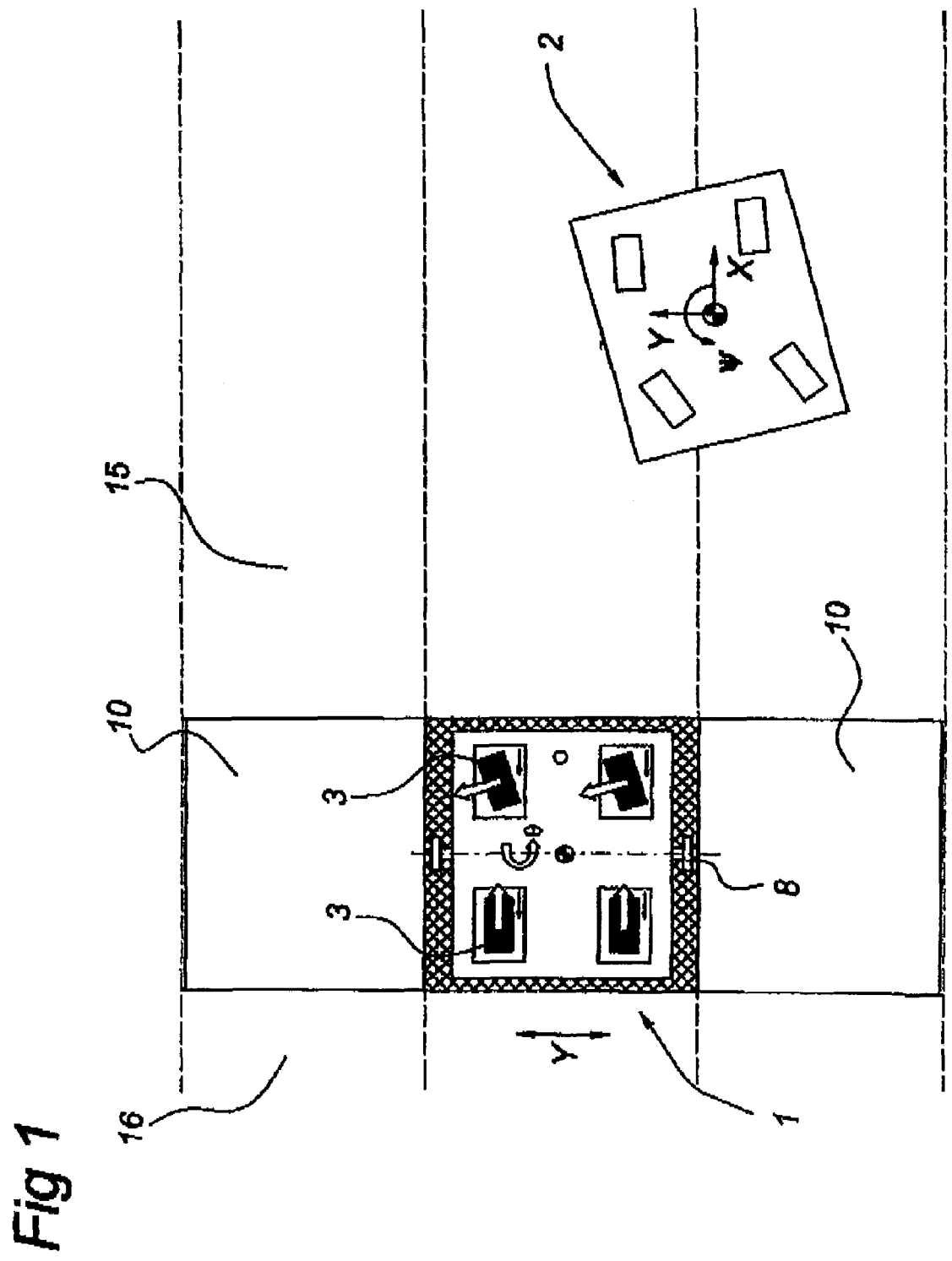
FIG. 1 shows a plan view of a first embodiment of the system according to the invention.

The test stand 1 comprises four benches 5 with endless belts 6 which are each wound around the drivable rolls 7. The vehicle 4 is attached to the horizontal transverse shaft 9 by means of a yoke 8. Consequently, the vehicle can execute rotary movements (pitch movements) about this transverse shaft 9 on the test stand 1. As shown in FIG. 1, the front wheels of the vehicle are steerable.

Figure 2:
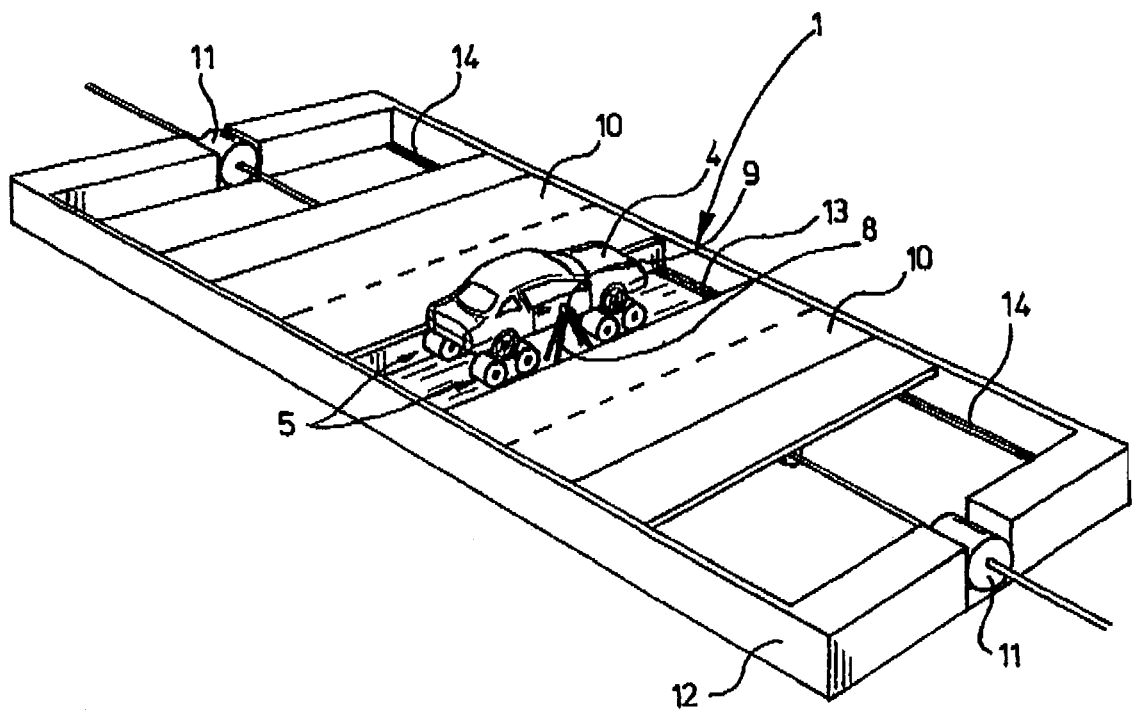
FIG. 2 shows a perspective view of the system shown in FIG. 1.
Figure 3:
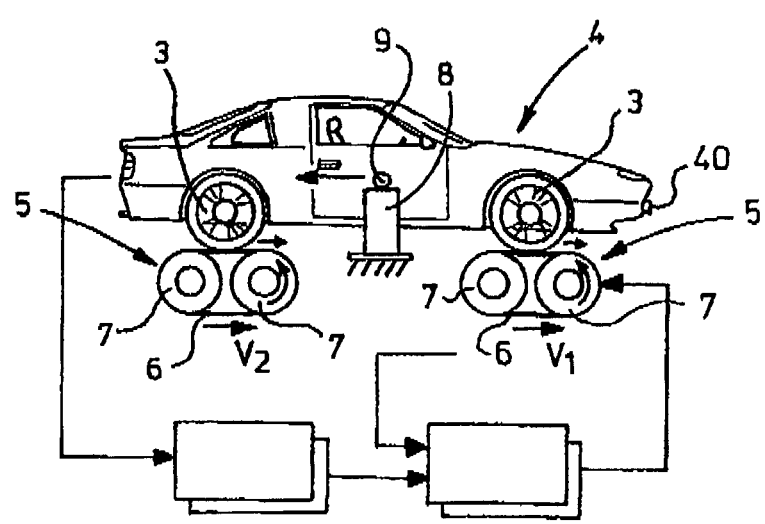
FIG. 3 shows a side view of the test stand.
Figure 4:
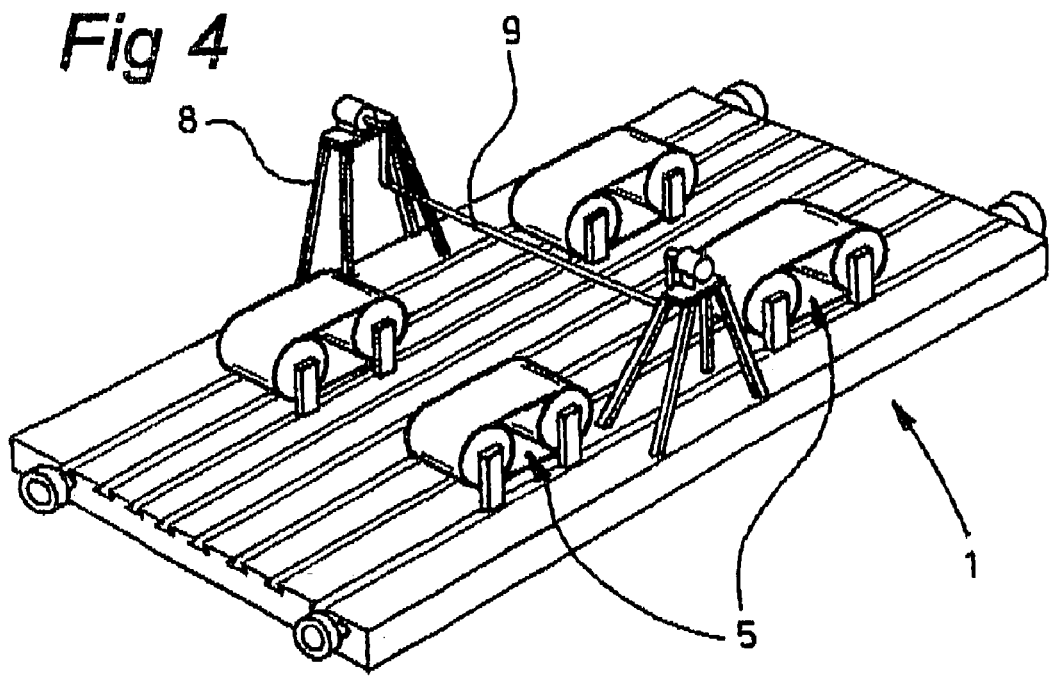
FIG. 4 shows a perspective view of the test stand.

The test stand 1 is delimited on both sides by a driving surface or road surface 10. These road surfaces 10 and the test stand 1 can be displaced independently of one another in the lateral direction by means of dedicated spindles 11, as shown in FIG. 2. These spindles 11 are mounted in a compartment 12 provided with rails 13, 14 on which the test stand 1 and the driving surface 10 respectively are displaceable.

On the front and rear sides of the test stand 1 and the driving surfaces 10 there are also driving surfaces 15, 16 which extend across the entire width of the test stand 1 and driving surfaces 10.

A mobile undercarriage 2 is positioned on top of these driving surfaces 10, 15, 16. In the exemplary embodiment illustrated, this undercarriage 2 comprises four wheels 16, which may all be steerable and drivable. The mobile undercarriage can then be manoeuvred in such a manner that it is able to execute movements with respect to the test stand 1 and the vehicle 4 situated thereon. These may, for example, be overtaking manoeuvres. The movements of the undercarriages 2 can be generated by the control computer. The movements of the undercarriage 2 can be detected by means of the sensor 40 on the vehicle.

On the other hand, it is also possible for the vehicle 4 on the test stand 1 to carry out transverse movements itself. In this case, it is possible to carry out tests which relate to an overtaking manoeuvre by the vehicle 4 on the test stand 1 itself.

Figure 5:
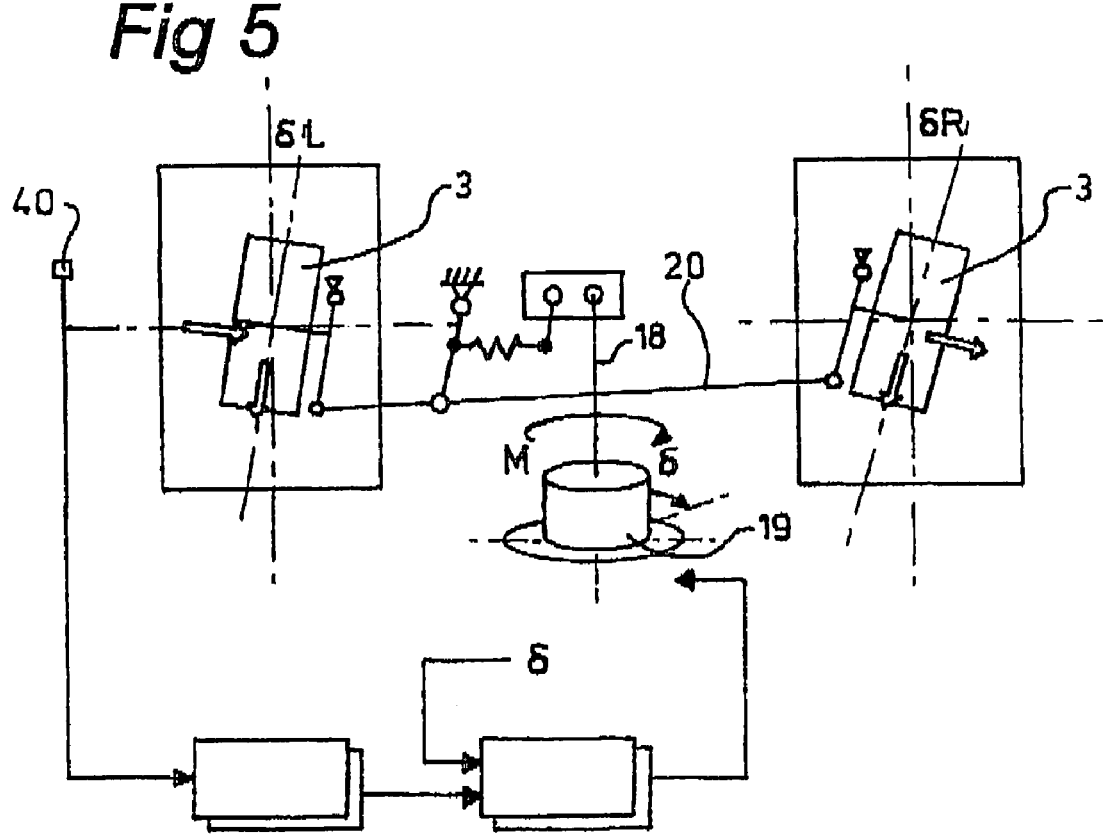
FIG. 5 shows a possible design of an active control system.

As shown in FIG. 5, a power-assisted steering column 18 in which a servomotor 19 is integrated may be used in the vehicle 4. Via the linkage 20, this steering column is connected to the front wheels 3 of the vehicle. The steering column carries out corrective turns on the basis of a computer model of the vehicle, in such a manner that the mechanical load and steering movement simulate reality. A design of the vehicle of this type makes the execution of, for example, overtaking manoeuvres, as described above, even more realistic.

Figure 6:
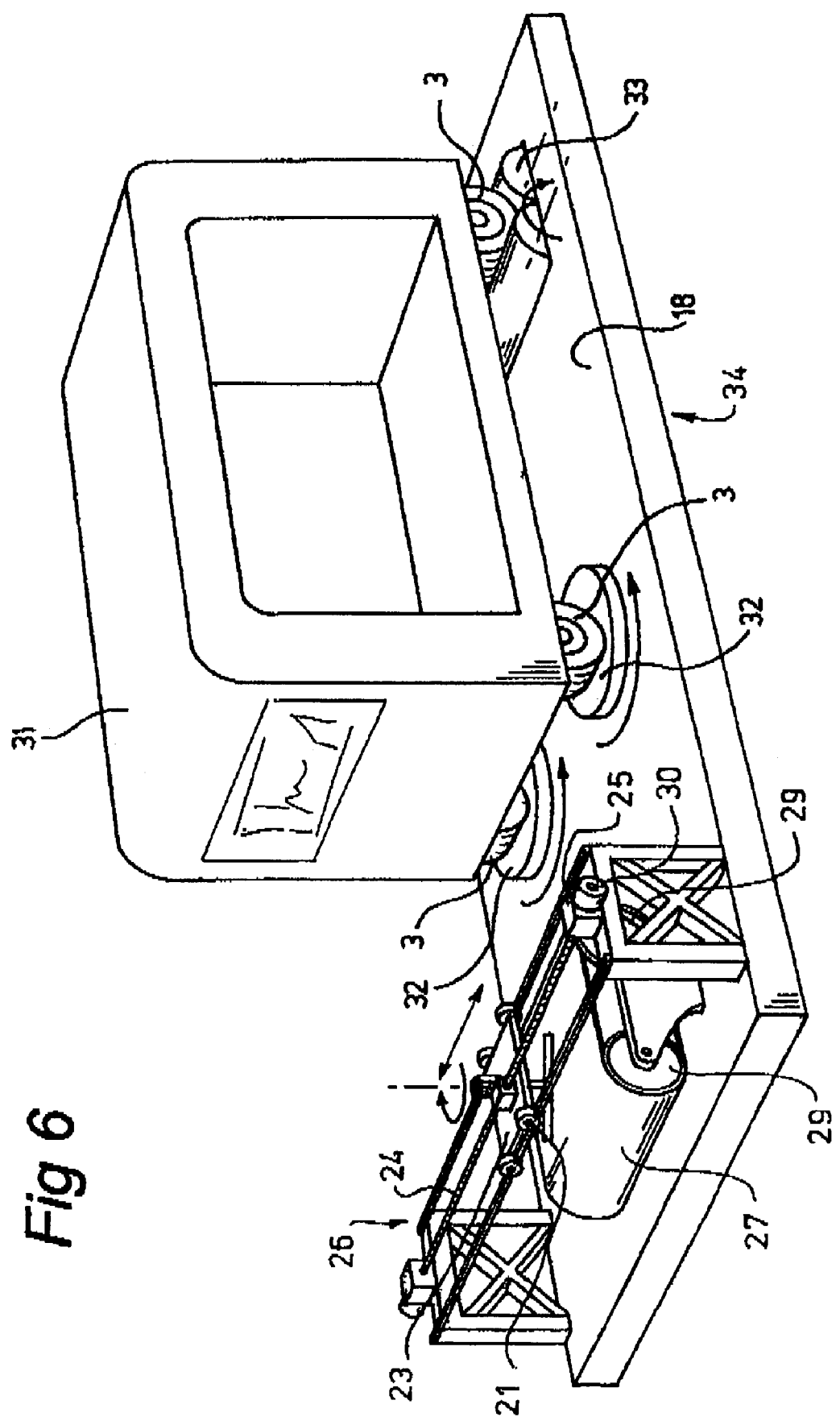
FIG. 6 shows a second embodiment of the system according to the invention.
Figure 7:
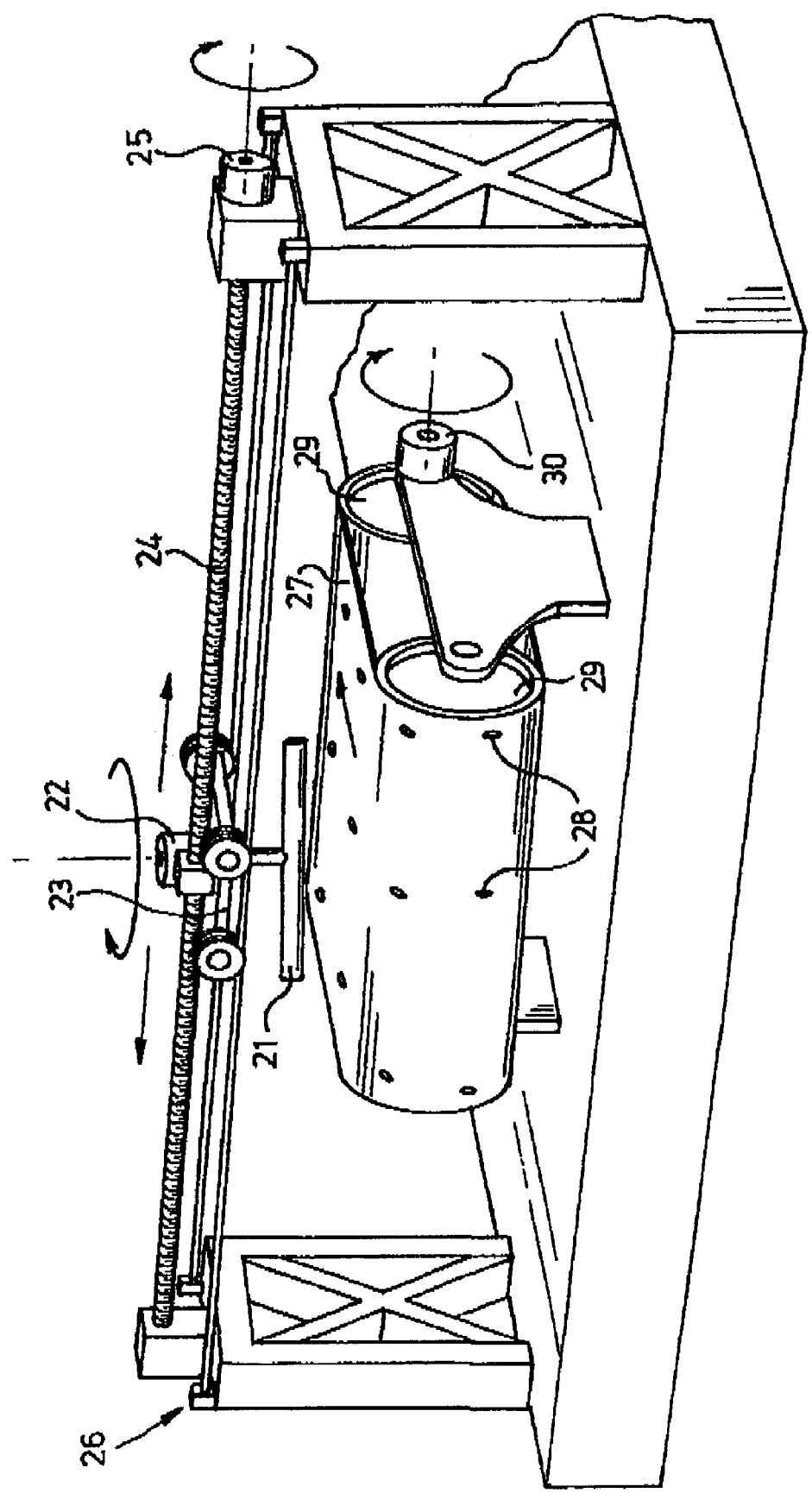
FIG. 7 shows a detail from FIG. 6 on an enlarged scale.

The second embodiment shown in FIGS. 6 and 7 shows a test stand 34 with a vehicle 31 for an underground transport system which can manoeuvre on a terminal 18. The vehicle 31 has two steerable wheels 3, which are each mounted on a turntable 32. The unsteerable rear wheels 3 are mounted on a rolling stand 33. A vehicle of this type has, in a known way, a drive and steering system which are controlled by a computer. In practice, a vehicle of this type moves over a terminal which is provided with a reference grid comprising a matrix of transponders or magnets. A rectilinear measurement antenna which is mounted beneath the vehicle allows the vehicle to determine its position on the terminal by interacting with the reference grid.

The system according to the invention can also be used with a system of this type. As shown in FIGS. 6 and 7, for this purpose the rectilinear measurement antenna 31 is mounted, in such a manner that it can be rotated by means of the servomotor 22, on a trolley 23, which in turn can be displaced back and forth by means of the spindle 24, which in turn is driven by a servomotor 25. The assembly is situated on a gantry structure 26 which is situated above an endless belt 27 on which a grid with magnet points 28 is arranged. The endless belt 27 is wound around the rolls 29 and can be driven by means of the servomotor 30. It is also possible for the antenna to be mounted so that it can be moved up and down, in order to be able to realistically adjust the distance from the road surface. Further possibilities include rotary movements about the other two axes as well as the vertical axis.

In this system, the relatively large and heavy vehicle is stationary, while its drive line is realistically simulated by the fact that the rear wheels 3 are mounted on the rolling stand 20 and the steerable front wheels 3 are mounted on the turntables 19. The control system measures a realistic longitudinal movement and longitudinal position on the basis of the movement of the grid pattern of the magnets 28 on the endless belt 27 measured by the rectilinear measurement antenna 21. Depending on the width of this endless belt 27, it is possible, for example, to study the vehicle performance under the influence of a slalom motion.

Although in FIGS. 6 and 7 the reference grid is arranged on a belt, other designs are also conceivable. For example, a reference grid of this type could alternatively be arranged on a roller or pulley.

What is claimed is:

1. System for carrying out research on a drivable vehicle (4,31) or a component thereof having an intelligent system comprising at least one sensor, actuator and on-board computer, said system comprising:
    a test stand (1,34) on which the vehicle (4,31) or the component can be positioned, in a stationary or simulated driven position, which vehicle (4,31) or which component is provided with at least one sensor (21,40) for receiving signals from the environment of the vehicle (4,31) or of the component,
    at least one object (2,27) which is situated in the vicinity of the test stand (1,34),
    means (11,30) for generating a relative movement between the test stand (1,34) and the at least one object (2,27), and
    a control computer for coordinating the relative movement between the test stand (1,34) and the object (2,27),
    in which the control computer holds a program which simulates at least part of the real state of the vehicle or of the component which is missing in the state in which the vehicle (4,31) or the object is situated on the test stand (1,34).

2. System according to claim 1, in which the coordination of the relative movement between the test stand (1, 34) and the object (2, 27) is carried out partly on the basis of the simulation of the real state of the vehicle (4, 31) or of the component which is created by the control computer.

3. System for carrying out research on a drivable vehicle (4,31) or a component thereof having an intelligent system comprising at least one sensor, actuator and on-board computer, said system comprising:
    a test stand (1,34) on which the vehicle (4,31) or the component can be positioned, in a stationary or simulated driven position, which vehicle (4,31) or which component is provided with at least one sensor (21,40) for receiving signals from the environment of the vehicle (4,31) or of the component,
    at least one object (2,27) which is situated in the vicinity of the test stand (1,34),
    means (11,30) for generating a relative movement between the test stand (1,34) and the at least one object (2,27), and
    a control computer for coordinating the relative movement between the test stand (1,34) and the object (2,27),
    in which the test stand (1,34) comprises a roller stand (33) or a stand (5) with endless belts (6) for interaction with at least the driven wheels (3) of the vehicle (4).

4. System according to claim 3, in which the test stand (1) comprises a support which allows the vehicle (4) to rotate about a transverse shaft (9) (pitch axis).

5. System according to claim 3, in which the test stand (1) comprises a support which allows the vehicle (4) to rotate about a vertical shaft (yaw axis).

6. System according to claim 3, in which the test stand (1) comprises a support which allows the vehicle to rotate about a longitudinal shaft (roll axis).

7. System according to claim 3, in which the test stand (1) can be displaced laterally by dedicated drive means (11).

8. System according to claim 7, in which the test stand (11) is displaceable on a lateral, linear guide (8), and a driving surface (10) which can be displaced independently of the test stand (1) is situated on at least one longitudinal side of the test stand (1).

9. System according to claim 8, in which a driving surface (10,15,16) which can be displaced independently of the test stand (1) is situated on one of opposing sides of the test stand (1).

10. System according to claim 7, in which a fixed driving surface (10, 15, 16) is situated at front and rear sides of the test stand (1).

11. System according to claim 7, in which the test stand (1) and each displaceable driving surface (10) are accommodated on a dedicated carriage (8, 9).

12. System according to claim 3, in which the test stand (1) is adjoined by a driving surface (10,15,16), and the object (22) can move over the driving surface.

13. System according to claim 3, in which the object comprises an undercarriage (2) which is provided with wheels, of which at least one wheel is drivable.

14. System according to claim 13, in which the undercarriage (2) has at least three wheels, and at least one wheel is steerable.

15. System for carrying out research on a drivable vehicle (4,31) or a component thereof having an intelligent system comprising at least one sensor, actuator and on-board computer, said system comprising:
- a test stand (1,34) on which the vehicle (4,31) or the component can be positioned, in a stationary or simulated driven position, which vehicle (4,31) or which component is provided with at least one sensor (21,40) for receiving signals from the environment of the vehicle (4,31) or of the component,
- at least one object (2,27) which is situated in the vicinity of the test stand (1,34),
- means (11,30) for generating a relative movement between the test stand (1,34) and the at least one object (2,27), and
- a control computer for coordinating the relative movement between the test stand (1,34) and the object (2,27),
- in which the object is designed as a revolving endless member (27) provided with measurement points (28), and the sensor (21) is situated in the vicinity of a surface of the revolving member (27) and can be displaced in the transverse direction along a surface of the member (27).

16. System according to claim 15, in which the revolving member comprises a belt (27) which is wound around two parallel rolls (29, 30).

17. System according to claim 15, in which the sensor comprises an antenna (21) which, at a distance from a part of the belt (27), is suspended from a linear guide (24,25) which extends transversely over the belt.

18. System according to claim 17, in which the antenna (21) can rotate in a plane which is parallel to said belt part.

19. System for carrying out research on a drivable vehicle (4,31) or a component thereof having an intelligent system comprising at least one sensor, actuator and on-board computer, said system comprising:
- a test stand (1,34) on which the vehicle (4,31) or the component can be positioned, in a stationary or simulated driven position, which vehicle (4,31) or which component is provided with at least one sensor (21,40) for receiving signals from the environment of the vehicle (4,31) or of the component,
- at least one object (2,27) which is situated in the vicinity of the test stand (1,34),
- means (11,30) for generating a relative movement between the test stand (1,34) and the at least one object (2,27), and
- a control computer for coordinating the relative movement between the test stand (1,34) and the object (2,27),
- the vehicle (4, 31) or the component thereof having an intelligent system comprising at least one sensor, actuator and on-board computer and being positioned on the test stand (1, 34), in the stationary or simulated drivable position, which vehicle (4, 31) or which component is provided with the at least one sensor (21, 40) for receiving signals from the environment of the vehicle (4, 31) or of the component,
- wherein the actuator is linked to one of a brake device, an engine management system, and a steering device.

20. System for carrying out research on a drivable vehicle (4,31) or a component thereof having an intelligent system comprising at least one sensor, actuator and on-board computer, said system comprising:
- a test stand (1,34) on which the vehicle (4,31) or the component can be positioned, in a stationary or simulated driven position, which vehicle (4,31) or which component is provided with at least one sensor (21,40) for receiving signals from the environment of the vehicle (4,31) or of the component,
- at least one object (2,27) which is situated in the vicinity of the test stand (1,34),
- means (11,30) for generating a relative movement between the test stand (1,34) and the at least one object (2,27), and
- a control computer for coordinating the relative movement between the test stand (1,34) and the object (2,27),
- the vehicle (4, 31) or the component thereof having an intelligent system comprising at least one sensor, actuator and on-board computer and being positioned on the test stand (1, 34), in the stationary or simulated drivable position, which vehicle (4, 31) or which component is provided with the at least one sensor (21, 40) for receiving signals from the environment of the vehicle (4, 31) or of the component,
- in which the vehicle is provided with an on-board computer, which on-board computer is connected to the control computer.

21. System for carrying out research on a drivable vehicle (4,31) or a component thereof having an intelligent system comprising at least one sensor, actuator and onboard computer, said system comprising:
- a test stand (1,34) on which the vehicle (4,31) or the component can be positioned, in a stationary or simulated driven position, which vehicle (4,31) or which component is provided with at least one sensor (21,40) for receiving signals from the environment of the vehicle (4,31) or of the component,
- at least one object (2,27) which is situated in the vicinity of the test stand (1,34),
- means (11,30) for generating a relative movement between the test stand (1,34) and the at least one object (2,27), and
- a control computer for coordinating the relative movement between the test stand (1,34) and the object (2,27),
- the vehicle (4, 31) or the component thereof having an intelligent system comprising at least one sensor, actuator and on-board computer and being positioned on the test stand (1, 34), in the stationary or simulated drivable position, which vehicle (4, 31) or which component is provided with the at least one sensor (21, 40) for receiving signals from the environment of the vehicle (4, 31) or of the component,
- in which the vehicle is provided with a communications system for transmitting information relating to the environment of the vehicle.

22. Method for carrying out research on a drivable vehicle (4, 31) or a component thereof having an intelligent system comprising at least one sensor, actuator and on-board computer, by means of the combination comprising:
- a test stand (1, 34) on which the vehicle (4, 31) or the component is positioned, in a stationary or simulated drivable position, which vehicle (4,31) or which component is provided with at least one sensor (21,40) for receiving signals from the environment of the vehicle (4, 31) or of the component, at least one object (2, 27) which is situated in the vicinity of the test stand (1, 34), means (11, 30) for generating a relative movement between the test stand (1, 34) and the at least one object (2, 27), and a control computer for coordinating the relative movement between the test stand (1, 34) and the object (2, 27), the method comprising the steps of:

operating the vehicle or the component on the basis of a program in the control computer which simulates at least part of the real state of the vehicle or of the component which is missing in the state in which the vehicle or the object is situated on the test stand, bringing about a physical change in the vicinity of the vehicle (4, 31) or of the component, detecting the physical change by the sensor and depending on received signals creating a change in the performance of the vehicle or of the component on the basis of the detected physical change, recording the performance of the vehicle (4, 31) or of the component which comes about on the basis of the physical change detected by the at least one sensor (21, 40).

23. Method according to claim 22, which involves operation of the vehicle or the component which is provided with:

at least one actuator (19) for influencing the movement of the vehicle (1) or the component, or a directing device for giving directions to a driver of the vehicle (1), regulating means for regulating the at least one actuator (19) on the basis of the signals received by the at least one sensor (21, 40), or regulating means which can be regulated by the driver on the basis of the direction given by the directing device, the method further comprising the step of recording the vehicle performance which comes about on the basis of the change imposed on the at least one actuator by the regulating means.

24. Method according to claim 23, in which the physical change is brought about by causing the at least one object (2) to move.

25. Method according to claim 24, in which the at least one object (2) is moved with at least one of a predetermined speed, acceleration and direction.

26. Method according to claim 23, involving operation of a vehicle (4) which is provided with the actuator (19) which is connected to the steering device of the vehicle (4), comprising the step of influencing the actuator (19) by means of the control computer for the purpose of carrying out corrective movements of the steering device in such a manner that the mechanical load and movements of the steering device correspond to a predetermined vehicle movement.

27. Method according to claim 22, for carrying out research into the overtaking performance of the vehicle using a system in which the vehicle (4) can be displaced transversely with respect to the vehicle longitudinal direction on the test stand (1), comprising the steps of:

positioning a mobile object (2) in front of the test stand (1), reversing the object (2) towards the test stand (1), displacing the test stand (1) laterally while simultaneously causing steering movements of the vehicle (4) to be carried out, reversing the object (2) along the test stand (1), displacing the test stand (1) back in the other lateral direction while simultaneously causing steering movements of the vehicle (4) to be carried out.

28. Method according to claim 22, for carrying out research on a vehicle (31) which is guided over a grid using a system in which the object is designed as a revolving endless member (27) provided with measurement points (28), and in which the sensor (21) is situated in the vicinity of a surface of the revolving member (27) and can be displaced in the transverse direction along a surface of the member, comprising the steps of:

causing the belt (27) to revolve, causing the sensor (21) to move in the transverse direction.

29. System for carrying out research on a drivable vehicle (4,31) or a component thereof having an intelligent system comprising at least one sensor, actuator and on-board computer, said system comprising:

a test stand (1,34) on which the vehicle (4,31) or the component can be positioned, in a stationary or simulated driven position, which vehicle (4,31) or which component is provided with at least one sensor (21,40) for receiving signals from the environment of the vehicle (4,31) or of the component, at least one object (2,27) which is situated in the vicinity of the test stand (1,34), means (11,30) for generating a relative movement between the test stand (1,34) and the at least one object (2,27), and a control computer for coordinating the relative movement between the test stand (1,34) and the object (2,27), wherein the control computer coordinates the relative movement between the test stand and the object based on measurement signals from the at least one sensor.

* * * * *